United States Patent [19]
Denker

[11] 3,785,634
[45] Jan. 15, 1974

[54] POSITIONING

[75] Inventor: James M. Denker, Scituate, Mass.

[73] Assignee: Nutron Corporation, Hingham, Mass.

[22] Filed: July 21, 1972

[21] Appl. No.: 273,833

[52] U.S. Cl. ............... 269/71, 33/174 TA, 74/469, 74/491, 248/23, 269/76
[51] Int. Cl. ............................................. B23g 3/06
[58] Field of Search ............... 74/469, 491; 248/23, 248/346 R; 33/1 M, 23 C, 174 TA; 214/1 B, 214/1 BB; 269/55, 71, 76

[56] References Cited
UNITED STATES PATENTS

| 3,608,884 | 9/1971 | Humphreys | 33/174 TA X |
| 510,648 | 12/1893 | Moore | 269/71 |
| 1,786,192 | 12/1930 | Cullman | 248/23 |
| 2,196,215 | 4/1940 | Kraus | 308/6 R |
| 2,456,039 | 12/1948 | Abramson | 248/23 |
| 3,376,764 | 4/1968 | Schardt | 248/346 |

Primary Examiner—Allan D. Herrmann
Attorney—James B. Lampert

[57] ABSTRACT

The invention features a positioning device comprising a workpiece support platform having a planar upper surface, a plurality of linkages, a linkage support member, means connected to the linkage support member for engaging a rotary tool machine, and means for supporting the platform with the upper surface thereof perpendicular to the axis of rotation of the rotary tool of the machine, each linkage being connected for pivotal motion about a first fixed axis relative to the platform and for pivotal motion about a second fixed axis relative to the linkage support, and the distance between the first and second axes being the same for each linkage.

9 Claims, 7 Drawing Figures

POSITIONING

This invention relates to positioning, and more particularly to positioning workpieces relative to rotating tools.

It is a primary object of the present invention to provide a positioning table that may be simply attached to a rotary machine tool for free lateral but no rotational movement in a plane perpendicular to the tool axis, thereby permitting a workpiece on the table to be simply and automatically aligned relative to the rotary tool. Other objects include providing such positioning tables that are simple and inexpensive to manufacture, are freely movable laterally but non-movable rotationally, which may be used with various types of existing rotary tools, and on which a variety of workpiece holders may be mounted.

The invention features a positioning device comprising a workpiece support platform having a planar upper surface, a plurality of linkages, a linkage support member, means connected to the linkage support member for engaging a rotary tool machine, and means for supporting the platform with the upper surface thereof perpendicular to the axis of rotation of the rotary tool of the machine, each linkage being connected for pivotal motion about a first fixed axis relative to the platform and for pivotal motion about a second fixed axis relative to the linkage support, and the distance between the first and second axes being the same for each linkage. In preferred embodiments wherein there may be two sets of linkages, or one set of linkages and rollers adapted for engaging slots in the worktable of the rotary tool machine, there is featured a set of three linkages which are circular or of equal length, the first and second axes of the linkages being spaced at 120° intervals around circles of equal diameter.

Other objects, features, and advantages will appear from the following detailed description of preferred embodiments of the invention, taken together with the attached drawings in which.

Figure 1:
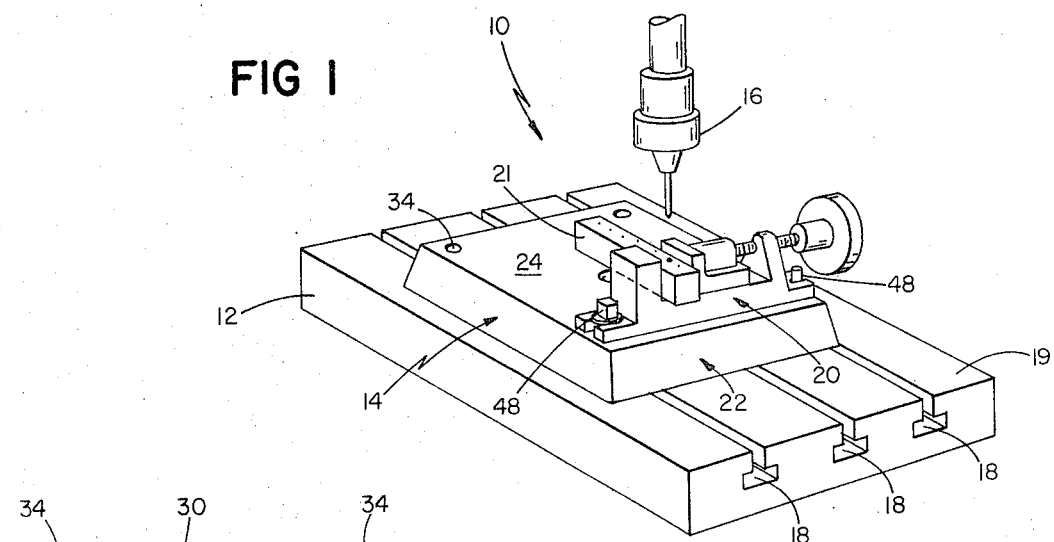
FIG. 1 is a perspective view of a drill press with a positioning table constructed according to the present invention mounted thereon.

Referring more particularly to the drawings, there is shown in FIG. 1 portions of a conventional drill press, generally designated 10, having a worktable 12 on which is mounted a positioning table, generally designated 14, and a drill 16 rotatable about an axis perpendicular to worktable 12. Three parallel "T" slots 18 are cut into the surface of and extend across worktable 12. A vise 20 holding a workpiece 21 is mounted on table 14.

Figure 2:
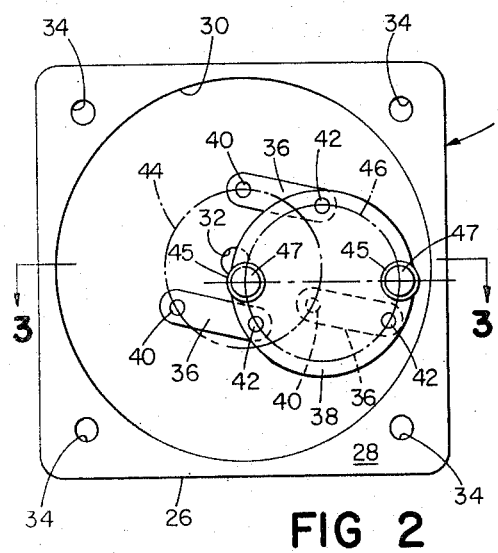
FIG. 2 is a bottom plan view of the positioning table of FIG. 1.
Figure 3:
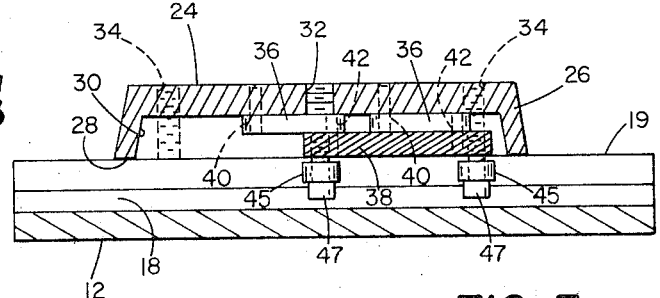
FIG. 3 is a sectional view of the positioning table of FIG. 1, taken at 3—3 of FIG. 2.
Figure 5:
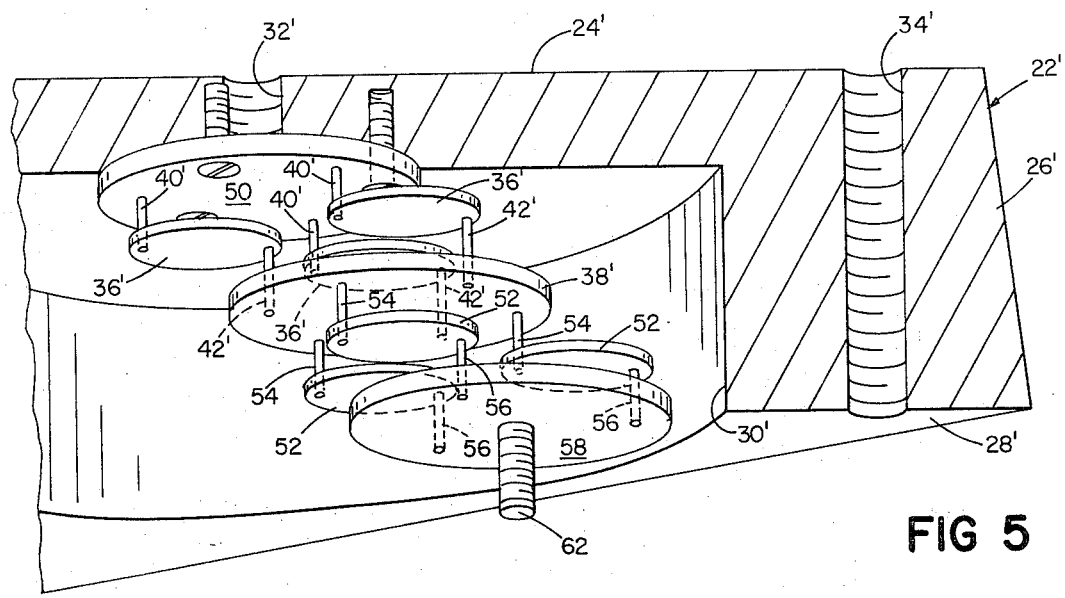
FIG. 5 is a perspective sectional view of portions of the positioning table of FIG. 4.
Figure 4:
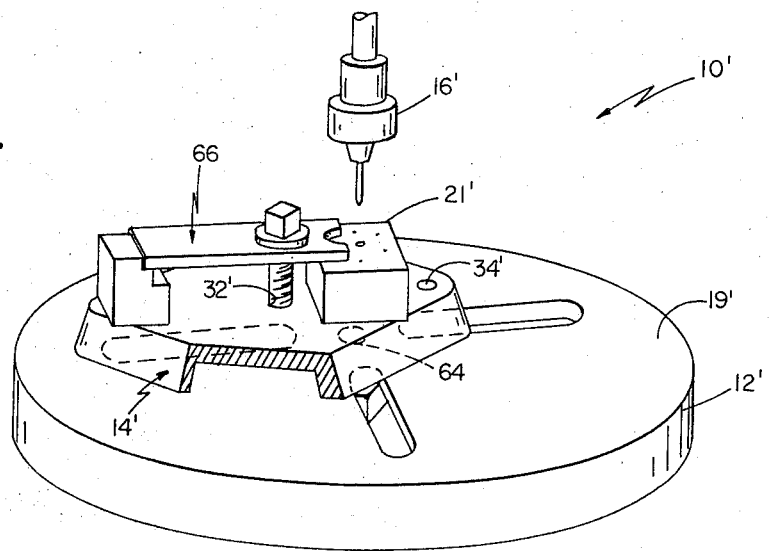
FIG. 4 is a perspective view, partially in section, of a second drill press with a second positioning table constructed according to the present invention mounted thereon.
Figure 6:
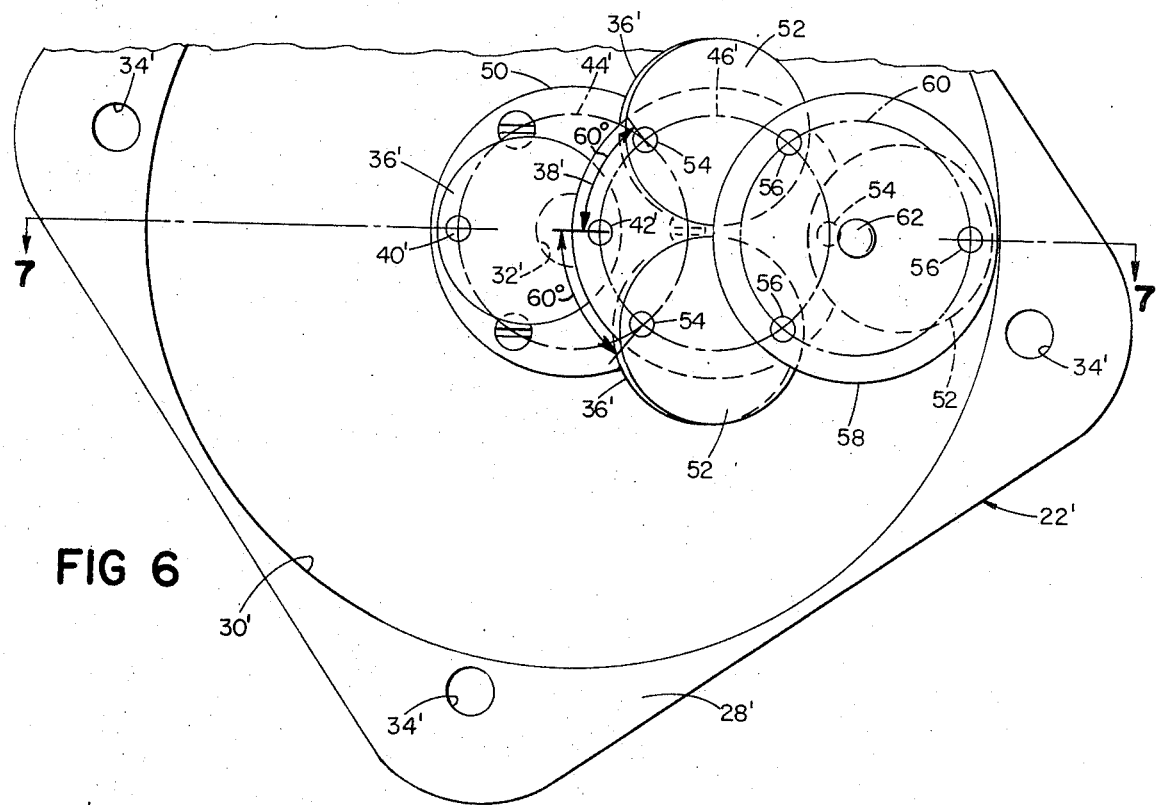
FIG. 6 is a bottom plan view of the positioning table of FIG. 4.
Figure 7:
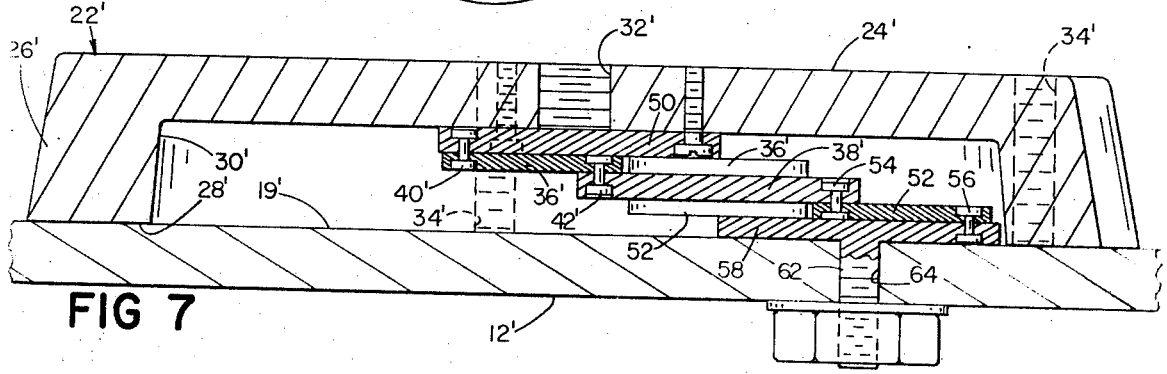
FIG. 7 is a sectional view taken at 7—7 of FIG. 6.

The construction of positioning table 14 is shown most clearly in FIGS. 2 and 3. As there shown, table 14 includes a workpiece support platform 22 having an upper surface 24 parallel to the upper surface 19 of worktable 14, a downwardly extending annular rim 26 whose lower surface 28 is parallel to upper surface 24 and slides on worktable upper surface 19, and a cylindrical recess 30 bounded by rim 26 and extending upwardly from the bottom of the platform.

Five threaded holes extend perpendicularly through platform 24. Hole 32 extends through the center of the platform; holes 34 are each adjacent a corner of the platform.

Within recess 30 are three parallelogram linkages 36 of equal length, and a circular linkage support 38. One end of each of linkages 36 is connected to platform 24 by a respective shoulder screw 40; the other end of each linkage 36 to linkage support 38 by a respective shoulder screw 42. As shown, screws 40 are connected to platform 24 at points spaced 120° from each other around a circle 44 concentric with platform center hole 32. Screws 42 are connected to linkage support 38 at points spaced 120° from each other around a circle 46 of diameter equal to that of circle 44. The heads of each of screws 40, 42 are recessed into linkages 36. The axis of each screw 40, 42 is perpendicular to platform surface 24 and center-to-center distance between screws 40, 42 is the same for each linkage 36. Each linkage 36 is thus pivotal relative to platform 24 about a first fixed axis defined by screw 40, and relative to linkage support 38 about a second fixed axis defined by screw 42.

A pair of rollers 45 are mounted on the underside of linkage support 38 by respective shoulder screws 47, the axis of screw 47 and axis of rotation of each roller 45 being perpendicular to platform surface 24.

In practice, positioning table 14 is mounted on worktable 12 by placing rollers 45 in one of "T" slots 18, the diameter of each of rollers 45 being slightly less than the width of the upper portion of the "T" slots, and resting rim lower surface 28 on worktable surface 19. Vise 20 is mounted on the table upper surface 24 by bolts 48 extending into a pair of holes, and workpiece 21 is placed in the vise.

Movement of the rollers 45 in the "T" slot provides a first degree of freedom of platform 24 relative to worktable 12 in a plane parallel to worktable surface 19; pivoting movement of linkages 36 provides a second degree of freedom of the platform in the same plane. The two degrees of freedom permit the platform 24, and hence workpiece 21, to be placed in any desired position relative to the worktable surface 19, and therefore relative to the rotary tool. The rollers and linkage, however, prevent any rotational movement of the platform relative to the worktable.

FIGS. 4–7 illustrate a second positioning table 14' constructed according to the present invention mounted on the drill press 10' whose worktable does not have "T" slots. Many of the parts of table 14' are substantially identical to those of table 14, and are identified by the same reference numeral, with a differentiating prime (') added thereto. As shown, table 14' includes a first set of linkages 36' connected to a first linkage support 38' and, through an upper disc support 50, to platform 24'. Each of linkages 36' is circular and is connected to upper disc support 50 and linkage support 38' by rivets 40', 42', respectively. As in table 14, the distance between rivets 40', 42' is the same for each linkage 36'; and the sets of rivets are spaced at 120° intervals around circles 44', 46' of equal diameter; and each linkage 36' is pivotal relative to platform 24' and linkage support 38' about, respectively, a first fixed axis defined by rivet 40' and a second fixed axis defined by rivet 42'.

Additionally, table 14' includes a second set of circular linkages 52 and a second circular linkage support 58. Each of linkages 52 is connected by rivets 54 to first linkage support 38' and is pivotal relative thereto about a respective third fixed axis defined by rivet 54; and by is connected rivets 56 to second linkage support 58 so as to be pivotal relative thereto about a respective fourth axis defined by rivet 56. The points of connection of rivets 54 are on circle 46', intermediate (at respective 60° intervals from) rivets 42'; the points of connection of rivets 56 are spaced at 120° intervals around a circle 60 of diameter equal to that of circles 44', 46'. The ends of the rivets of the two linkage sets are recessed as required to provide smooth relative motion of the linkages and linkage supports. A threaded stud 62 extends perpendicularly downwardly from the center of second linkage support 54.

In practice, positioning table 14' is mounted on a worktable by dropping stud 62 through a hole 64 in worktable 12' and bolting the stud in place. A workpiece is held in place on table 14' by a clamp mechanism 66 bolted to central hole 32'. The first set of linkages, linkages 36', provides a first degree of freedom of platform 24' relative to the worktable in a plane parallel to the worktable surface; the second set of linkages, linkages 52, provides a second degree of freedom. As in the case of table 14, the linkages permit the platform to move freely laterally in the plane, but prevent rotary movement of the platform relative to the worktable. The circular configuration of the linkages prevents the linkages and linkage supports from hanging up on each other during movement of the platform.

Other embodiments within the scope of the following claims will occur to those skilled in the art.

I claim:

1. A positioning device for use with a rotary tool machine, said device including:
   a workpiece support platform having a planar upper surface;
   a first set of linkages, said first set comprising three linkages; and,
   a first linkage support member,
   each of said linkages being connected for pivotal motion about a respective first axis fixed relative to said platform and for pivotal motion about a respective second axis fixed relative to said first linkage support, the distance between said first and second axes being the same for each of said linkages,
   said first axes of said linkages being spaced at 120° intervals about a first circle, and said second axes of said linkages being spaced at 120° intervals about a second circle of diameter equal to that of said first circle.

2. The device of claim 1 wherein said platform includes a downwardly extending annular rim defining at its lower edge a worktable engagement surface parallel to the upper surface of said platform.

3. The device of claim 1 wherein said linkages and said linkage support member are circular.

4. The device of claim 1 including a second set of three linkages and a second linkage support member, each of said second set linkages being connected for pivotal movement about a respective third axis fixed relative to said first linkage support member and for pivotal movement about a respective fourth axis fixed relative to said second linkage support member, said third axes being spaced at 120° intervals about a third circle, said fourth axes being spaced at 120° intervals about a fourth circle diameter equal to that of said third circle, and said second support member being adapted for connection to said machine worktable.

5. The device of claim 4 wherein each of said first, second, third and fourth circles are of equal diameter, and each of said third axes is positioned midway between a respective pair of said second axes.

6. The device of claim 4 wherein said platform includes a downwardly extending annular rim defining at its lower edge a worktable engagement surface parallel to the upper surface of said platform, and said linkages and said support members are disposed in a cavity bounded by said annular rim.

7. The device of claim 6 wherein said linkages and said support members are circular.

8. A positioning device for use with a rotary tool machine including a worktable having a slot in the upper surface thereof, said device comprising:
   a workpiece support platform having a planar upper surface;
   a first set of linkages;
   a first linkage support member; and,
   a plurality of rollers attached to said linkage support member and adapted for engaging said slot in said upper surface of said worktable,
   each of said linkages being connected for pivotal motion about a respective first axis fixed relative to said platform and for pivotal motion about a respective second axis fixed relative to said first linkage support, the distance between said first and second axes being the same for each of said linkages.

9. A positioning device for use with a rotary tool machine, said device comprising:
   a workpiece support platform having a planar upper surface;
   a first set of linkages;
   a first linkage support member;
   a second set of linkages; and,
   a second linkage support member,
   each of said linkages of said first set being connected for pivotal motion about a respective first axis fixed relative to said platform and for pivotal motion about a respective second axis fixed relative to said first linkage support, the distance between said first and second axes being the same for each of said linkages of said first set, and
   each of said linkages of said second set being connected for pivotal movement about a respective third axis fixed relative to said first linkage support member and for pivotal motion about a respective fourth axis fixed relative to said second linkage support member, the distance between said third and fourth axes being the same for each of said linkages of said second set.

* * * * *